United States Patent
Meyer

(10) Patent No.: US 10,728,522 B2
(45) Date of Patent: Jul. 28, 2020

(54) CONTROL DEVICE FOR A CAMERA APPARATUS, CAMERA ARRANGEMENT AND METHOD FOR THE STEREOSCOPIC RECORDING OF A MONITORING AREA

(71) Applicant: Robert Bosch GmbH, Stuttgart (DE)

(72) Inventor: Michael Meyer, Sibbesse (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/614,459

(22) PCT Filed: Apr. 27, 2018

(86) PCT No.: PCT/EP2018/060855
§ 371 (c)(1),
(2) Date: Nov. 18, 2019

(87) PCT Pub. No.: WO2018/215166
PCT Pub. Date: Nov. 29, 2018

(65) Prior Publication Data
US 2020/0186778 A1 Jun. 11, 2020

(30) Foreign Application Priority Data
May 22, 2017 (DE) .................. 10 2017 208 607

(51) Int. Cl.
*H04N 13/189* (2018.01)
*H04N 5/232* (2006.01)
(Continued)

(52) U.S. Cl.
CPC ......... *H04N 13/189* (2018.05); *G01B 11/026* (2013.01); *H04N 5/23206* (2013.01);
(Continued)

(58) Field of Classification Search
CPC ............. H04N 13/189; H04N 5/23299; H04N 5/23206; H04N 5/23222; H04N 2013/0081; H04N 2013/0092; G01B 11/026
See application file for complete search history.

(56) References Cited

U.S. PATENT DOCUMENTS

| 6,320,618 B1* | 11/2001 | Aoyama | H04N 5/3696 348/335 |
| 2014/0375541 A1* | 12/2014 | Nister | A61B 3/113 345/156 |
| 2018/0101744 A1* | 4/2018 | Bar-Nahum | G06K 9/00993 |

FOREIGN PATENT DOCUMENTS

DE    102008001076    10/2009

OTHER PUBLICATIONS

International Search Report for Application No. PCT/EP2018/060855 dated Jul. 20, 2018 (English Translation, 2 pages).
(Continued)

*Primary Examiner* — Michael E Teitelbaum
(74) *Attorney, Agent, or Firm* — Michael Best & Friedrich LLP

(57) ABSTRACT

The stereoscopic recording and evaluation of a monitoring area frequently requires high computer powers. A control device (2) for a camera apparatus (3) for the stereoscopic recording of a monitoring area is proposed. In this case, recorded monitoring images (10, 11) have their resolution reduced in particular areas by a processing module and are converted into reduced images (16, 17). The reduced images have a high-resolution section (20) and a low-resolution section (19), wherein the high-resolution section (20) is a respective section showing a distant area of the monitoring area (5), the distant area being an area of the monitoring area (5) that is further away from the camera apparatus (3) than a bounding object area (G). An evaluation module (15) is
(Continued)

used to stereoscopically evaluate the monitoring area (5) based on the first reduced image (16) and the second reduced image (17).

12 Claims, 3 Drawing Sheets

(51) Int. Cl.
*G01B 11/02* (2006.01)
*H04N 13/00* (2018.01)
(52) U.S. Cl.
CPC ..... *H04N 5/23222* (2013.01); *H04N 5/23299* (2018.08); *H04N 2013/0081* (2013.01); *H04N 2013/0092* (2013.01)

(56) References Cited

OTHER PUBLICATIONS

Bedat, L., et al., "Low bit-rate codec based on LAR method for video surveillance via internet". 2000 10th European Signal Processing Conference. IEEE, Sep. 4, 2000, pp. 1-4.
Deforges, O., et al., "Region of interest coding for low bit rate image transmission". Multimedia and Expo. 2000. ICME 2000. 2000 IEEE International Conferen ce on New York, NY, USA, Issue 1, Jul. 30, 2000, pp. 107-110.

\* cited by examiner

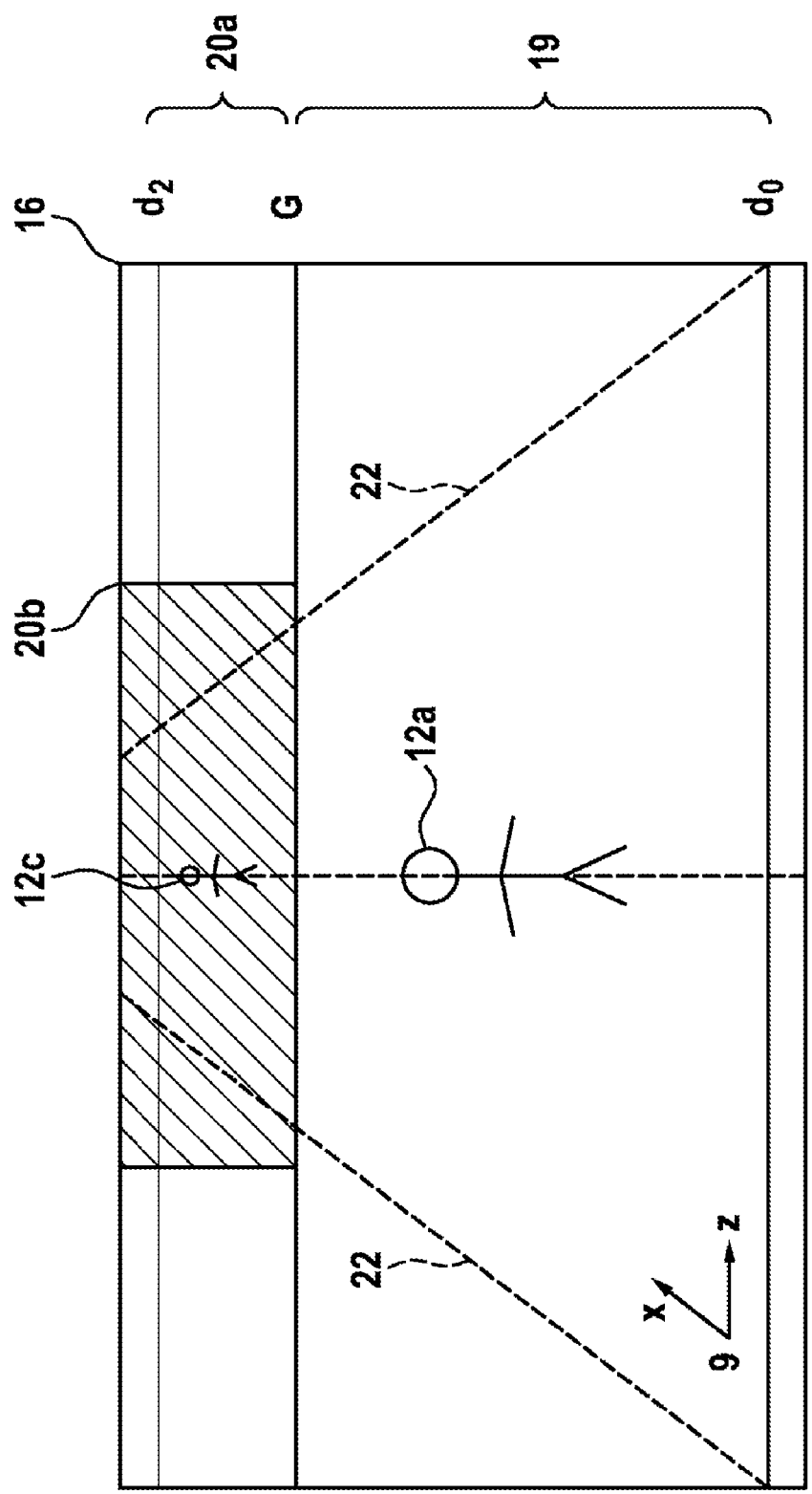

CONTROL DEVICE FOR A CAMERA APPARATUS, CAMERA ARRANGEMENT AND METHOD FOR THE STEREOSCOPIC RECORDING OF A MONITORING AREA

BACKGROUND OF THE INVENTION

The invention relates to a controller for a camera device for stereoscopically recording a monitoring area containing objects.

Stereo cameras that allow a depth measurement are known from video monitoring technology. Such cameras are used for example to detect obstacles. In depth estimation using stereo cameras, the accuracy of the measurement on the one hand increases with the image resolution of the image-recording device that is used. On the other hand, however, the required computational power also increases with the image resolution.

Document DE 10 2008 001 076 A1, which arguably forms the closest prior art, describes a method for reducing the resolution of an input image, wherein the input image shows a scene recorded by a monitoring camera. The method is characterized in that the reduction in resolution is adjusted taking into account the object distance in the scene and/or the perspective distortion of the three-dimensional scene.

SUMMARY OF THE INVENTION

In the context of the invention, a controller for a camera device is proposed. Furthermore, a camera arrangement and a method for stereoscopically recording the monitoring area is proposed. Preferred and/or advantageous embodiments of the invention become apparent from the dependent claims, the following description and the appended figures.

According to the invention, a controller for a camera device for stereoscopically recording a monitoring area containing objects is proposed. The controller is designed to drive, operate and/or use the camera device and/or a multiplicity of camera devices. The camera device is designed to stereoscopically record the monitoring area. The stereoscopic recording is in particular a 3D image recording or a 3D evaluation of the monitoring area. The stereoscopic recording should in particular be understood to mean a three-dimensional evaluation and/or recording of the monitoring area. An object or a multiplicity of objects are arranged in the monitoring area. The monitoring area is preferably a partial area of a monitoring region. The monitoring area and/or the monitoring region is for example an open space or an indoor area, specifically an airport, a railway station or a safety-relevant area.

The camera device comprises a first camera unit and a second camera unit. The first camera unit and the second camera unit may be designed as separate cameras. As an alternative and/or in addition, the first camera unit and the second camera unit are designed as image-recording sensors in the camera device, for example a common housing. The first camera unit and the second camera unit are preferably cameras and/or image-recording sensors for recording a color image, a black and white image, a video or a single image.

The first camera unit is designed to record a first monitoring image of the monitoring area. The monitoring image is in particular a 2D image of the monitoring area. The second camera unit is designed to record a second monitoring image, wherein the second monitoring image shows the monitoring area. The first monitoring image and the second monitoring image in particular have an area of overlap, wherein this area of overlap shows a common area of the monitoring area. In particular, the first monitoring image and the second monitoring image are recorded at the same time. As an alternative, the first monitoring image and the second monitoring image are recorded at separate times.

The camera device is designed to provide the first monitoring image and the second monitoring image to the controller. In particular, the camera device and the controller have a data connection in order to transfer the first monitoring image and the second monitoring image. The data connection between the camera device and the controller may be a wired connection or a wireless connection, such as for example a radio connection. In particular, the first monitoring image and the second monitoring image are able to be stored and/or able to recorded as data in the controller.

The distance between the first camera unit and an object in the monitoring area and the distance between the second camera unit and the object in the monitoring area is referred to in each case as object distance. For a multiplicity of objects in the monitoring area, there is in each case a multiplicity of object distances for the first and second camera unit. In particular, the distance between the camera unit and the object is the distance between the image plane of the camera unit and the object in the monitoring area.

The first camera unit and the second camera unit are preferably arranged spaced apart from one another such that, for an object situated in the monitoring area, two different object distances result for the first camera unit and the second camera unit. In particular, the monitoring area is able to be divided into sections, wherein these sections are also able to be understood as objects in the monitoring area, such that different object distances may result for the sections of the monitoring area.

The controller has a processing module. The processing module is in particular a data processing module. By way of example, the processing module is a computer unit, a microprocessor or a microcontroller. The processing module is designed to process the first monitoring image so as to form a first reduced image. Furthermore, the processing module is designed to process the second monitoring image so as to form a second reduced image. In particular, the first reduced image has a lower overall resolution than the first monitoring image, wherein the second reduced image has a lower overall resolution than the second monitoring image. In particular, the processing module is designed to generate the first reduced image from the first monitoring image through a sectional reduction of the resolution of the first monitoring image. Furthermore, the processing module is designed to generate the second reduced image from the second monitoring image through a sectional reduction in resolution of the second monitoring image.

The first reduced image has a high-resolution section and a low-resolution section. Likewise, the second reduced image has a high-resolution section and a low-resolution section. It is possible in particular for the first reduced image and the second reduced image to have a multiplicity of high-resolution sections and/or low-resolution sections. The low-resolution section is in particular in each case a flat area in the reduced image. Likewise, the high-resolution section is in particular preferably a flat area in the reduced image. By way of example, it is possible for the high-resolution section and the low-resolution section to transition continuously into one another, or alternatively the high-resolution section transitions abruptly into the low-resolution section.

The high-resolution section of the first reduced image and/or of the second reduced image in each case shows a section of the first monitoring image and/or of the second monitoring image that is a remote area of the depicted monitoring area. The remote area is an area of the monitoring area that is further away from the camera unit than a settable and/or set limit object area. The limit object area may be linear or flat, and the limit object area in particular has a maximum and a minimum distance, wherein the maximum and minimum distance is in particular a maximum and minimum object distance of the limit object area. A linear limit object area is especially a limit object distance. Areas and/or sections of the monitoring area that are closer to the camera unit than the limit object area and/or the limit object distance form a near area of the monitoring area. The low-resolution section of the reduced image in each case shows a section of the monitoring image and/or a section of the reduced image that shows a near area of the monitoring area.

The resolution is understood in particular to mean the pixel count and/or the number of pixels in an image, for example the pixels per image, the pixels per row and/or the pixels per column. The resolution comprises in particular the color depth, such that a reduction in the resolution may correspond to a reduction in the color depth of the image. The reduction of the resolution furthermore relates to the reduction of the pixels in the image, for example the number of pixels per row and/or the number of pixels per column.

The controller has an evaluation module for stereoscopically evaluating the monitoring area based on the first reduced image and the second reduced image. The evaluation module is in particular part of the processing module. The evaluation module is especially a computer unit, a microprocessor or a microcontroller unit. Based on the first reduced image and the second reduced image, the evaluation module is in particular designed to determine and/or to estimate distances and/or spacings in the depicted monitoring area. It is in particular possible to determine distances and/or spacings of the depicted monitoring area and/or between objects in the monitoring area in three dimensions.

One idea of the invention is to provide a controller for a camera device in which only a small area of the recorded image is computed and/or evaluated at full resolution, without falling below a required measurement accuracy. To this end, the present invention proposes a controller in which the accuracy is ensured in the relevant image areas, but at the same time the required computational power is considerably reduced.

In one particularly preferred configuration of the invention, the control unit has an input module for inputting the limit object area and/or limit object distance. In particular, the input module is designed for the numeric, alphanumeric or graphic input of the limit object area and/or of the limit object distance. By way of example, the input module is a computer keyboard, a touchpad or a computer mouse. This configuration is based on the idea of providing a particularly easily settable controller.

In one possible configuration of the invention, the input module has a display unit for displaying the first monitoring image and/or for displaying the second monitoring image. By way of example, the display unit is designed as a touchscreen or touch panel, wherein the first monitoring image and/or the second monitoring image is able to be displayed on the touchscreen and/or the touch panel and the limit object area and/or the limit object distance is able to be input and/or able to be defined directly. The input module is preferably designed such that a user of the controller is able to define and/or able to set the limit object distance graphically in the displayed first monitoring image and/or graphically in the second monitoring image. By way of example, the user is able to select and define the limit object area and/or the limit object distance optically in the first monitoring image and/or in the second monitoring image. This configuration is based on the idea of providing an intuitively controllable and/or settable controller.

It is particularly preferable for the input module to be designed such that the user is able to define the limit object area and/or the limit object distance by selecting a linear boundary in the first monitoring image and/or in the second monitoring image. By way of example, the user to this end selects a line in the first monitoring image and/or in the second monitoring image, wherein the line separates the high-resolution and the low-resolution area. As an alternative and/or in addition, the input module is designed such that the user is able to define the limit object area and/or the limit object distance by selecting a flat area and/or section in the first monitoring image and/or in the second monitoring image. By way of example, the user to this end defines a flat section in the monitoring image, wherein the defined section may be for example the high-resolution and/or the low-resolution area.

In one possible configuration of the invention, it is provided for the input module to be designed such that the user is able to manually crop the high-resolution section. By way of example, the controller proposes a high-resolution section, wherein this section is depicted graphically in the displayed monitoring image and/or in the displayed reduced image. If the user finds that the high-resolution area has been selected so as to be too large and/or it is able to be reduced, it is thus possible for the user to crop the high-resolution area and manually select those areas of the originally high-resolution area that should be dispensed with and should become a low-resolution section. This configuration is based on the idea that a user is able to reduce the computational power even further based on human information.

It is particularly preferred for the reduction of the first monitoring image so as to form the first reduced image to be based on a first limit object area, wherein the reduction of the second monitoring image so as to form the second reduced image is based on a second limit object area. Preferably, the first limit object area and the second limit object area are identical. As an alternative, the first limit object area is different from the second limit object area; for example, the first limit object distance is greater than the second limit object distance. In particular, it is possible for the first limit object area and the second limit object area to be synchronized and/or coupled; for example, the first limit object distance changes proportionally or indirectly proportionally to the second limit object distance.

In one particularly preferred configuration of the invention, the resolution of the high-resolution section is at least twice as great as the resolution of the low-resolution section. As an alternative and/or in addition, the resolution of the high-resolution section is at least three times, especially at least four times as great as the resolution of the low-resolution section.

In one possible configuration of the invention, the first reduced image has a multiplicity of sections and the second reduced image likewise has a multiplicity of sections, wherein the sections each have different resolutions. The processing module is in particular designed to define the resolution of the different sections such that the ratio of resolution to object distance does not fall below a definable and/or defined limit value. This configuration is based on the idea that the accuracy of the measurement in an image is proportional to the ratio of the image resolution that is used and the distance from the object to the camera. This configuration thus defines a minimum accuracy for sections of the reduced images, wherein it is not permitted to fall below the accuracy.

In one possible configuration of the invention, the evaluation module is designed to provide a stereoscopic image of the monitoring area based on the first reduced image and the second reduced image. In particular, the evaluation module is designed to provide a three-dimensional model and/or a 3D image of the depicted monitoring area based on the first reduced image and the second reduced image. The stereoscopic image comprises in particular distances and/or spacings between objects in the depicted monitoring area and/or between the camera unit and depicted objects in the monitoring area.

It is particularly preferred for the first camera unit to be designed to record a first test image, wherein the second camera unit is designed to record a second test image. The first test image and the second test image in particular have an overlap, wherein this overlap shows an identical area of the monitoring area. The processing module is in particular designed to estimate object distances based on the first test image and on the second test image, wherein the object distances are estimated object distances between objects in the monitoring area and the camera unit. The processing module is preferably designed to estimate the areas of the high-resolution section and/or low-resolution section in the reduced image. By way of example, the processing module estimates the regions and/or sections in which the low-resolution sections are situated, in particular which sections of the monitoring image need to be reduced in order to obtain the reduced image. This configuration is based on the idea of providing a controller that ensures simple initialization.

A further subject of the invention is a camera arrangement. The camera arrangement comprises the camera device and the controller as claimed in one of the claims and/or as described above in the description. The camera device and the controller in particular have a data connection, wherein the camera device provides the first monitoring image and the second monitoring image to the controller as data. This subject of the invention is based on the idea of providing a compatible unit consisting of the camera device and the controller and which allows stereoscopic recording of a monitoring area.

A further subject of the invention is a method for stereoscopically recording and/or stereoscopically monitoring a monitoring area. The method is in particular for stereoscopically recording the monitoring area using the camera arrangement described above. A first monitoring image of the monitoring area is recorded by way of a first camera unit, wherein a second monitoring image of the monitoring area is recorded by way of the second camera unit. The first monitoring image and the second monitoring image preferably have an overlap. The distance between the camera unit and an object in the monitoring area is in each case referred to as object distance. The method makes provision for the first monitoring image to be processed so as to form a first reduced image and for the second monitoring image to be processed so as to form a second reduced image. The first reduced image and the second reduced image each have a high-resolution and a low-resolution section. The high-resolution section is in each case a section that shows a remote area of the monitoring area, wherein the low-resolution section is an area that shows a near area of the monitoring area. According to the invention, the method makes provision for the monitoring area to be stereoscopically evaluated and/or monitored based on the first reduced image and the second reduced image. The stereoscopic evaluation and/or monitoring is for example the creation of a three-dimensional image and/or model of the depicted monitoring area. The stereoscopic evaluation is furthermore for example a determination of distances of objects in the monitoring area.

BRIEF DESCRIPTION OF THE DRAWINGS

Further features, advantages and effects of the invention become apparent from the following description and the appended figures, in which:

FIG. 3 shows a reduced image of the monitoring area.

DETAILED DESCRIPTION

Figure 1:
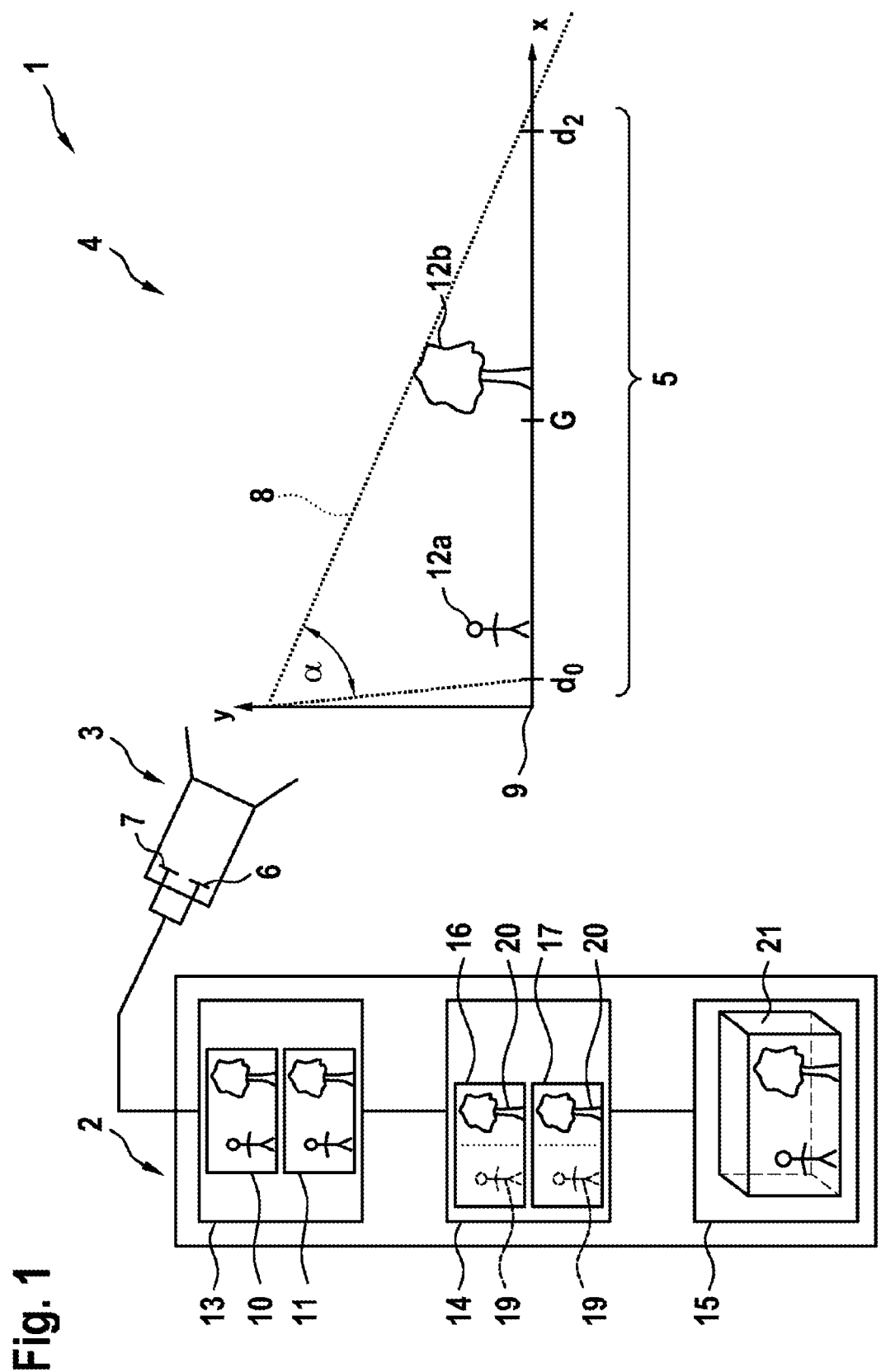
FIG. 1 shows an exemplary embodiment of a camera arrangement.

FIG. 1 schematically shows a camera arrangement 1. The camera arrangement 1 comprises a controller 2 and a camera device 3.

The camera device 3 is arranged in a monitoring region 4. The camera device 3 is designed to monitor a monitoring area 5, wherein the monitoring area 5 is a partial area of the monitoring region 4. The monitoring region 4 is for example an open space or an indoor area, such as for example an airport building.

The camera device 3 comprises a first camera unit 6 and a second camera unit 7. The first camera unit 6 and the second camera unit 7 are designed as imaging sensors, for example as CCD sensors or CMOS sensors. The camera device has a field of view 8, wherein the field of view 8 has an angle of aperture $\alpha$ in the XY plane. To this end, a coordinate system 9 is plotted by way of assistance. The Y direction of the coordinate system 9 is in particular the height direction. The angle of aperture $\alpha$ of the field of view 8 is in particular greater than fifty degrees, and especially greater than seventy degrees. In this exemplary embodiment, the angle of aperture $\alpha$ is sixty degrees.

The camera device 3 is designed to record monitoring images 10, 11 of the monitoring area 5. In this case, the first camera unit 6 is designed to record a first monitoring image 10 of the monitoring area 5. The second camera unit 7 is designed to record a second monitoring image 11 of the monitoring area 5. In particular, the first monitoring image 10 and the second monitoring image 11 form a common area of the monitoring area 5. To be able to perform a stereoscopic evaluation of the monitoring area 5 based on the first monitoring image 10 and the second monitoring image 11, the first camera unit 6 and the second camera unit 7 are arranged spaced apart from one another. In particular, the first camera unit 6 and the second camera unit 7 are spaced apart within the image plane of the camera device 3.

Objects 12a and 12b are arranged in the monitoring area 5. By way of example, the object 12a is a human and the object 12b is a tree. The human, as object 12a, is situated closer to the camera device 3 than the object 12b. The distance between an object 12a, 12b and the camera device 3 is understood as object distance d, wherein the object distance of the object 12a is Da and the object distance of the object 12b is $d_b$. In particular, the monitoring area 5 is divided into sections, wherein the sections of the monitoring area 5 likewise have object distances. By way of example, the object distance $d_0$ corresponds to that point of the monitoring area 5 that is nearest to the camera device 3, wherein the object distance $d_2$ corresponds to that object distance d that is furthest away from the camera device 3. It is possible to define a limit object area G for the camera arrangement 1, wherein, in this exemplary embodiment, the limit object area is a linear object distance G. In this exemplary embodiment, the limit object distance G is situated in the middle between the object distances $d_0$ and $d_2$.

The controller 2 is designed for example as a computer unit. As an alternative, the controller 2 is a processor apparatus or a microcontroller. The controller 2 comprises a storage module 13, a processing module 14 and an evaluation module 15. The controller 2 has a data connection to the camera device 3. The data connection between the camera device 3 and the controller 2 is for example a wired connection, or as an alternative the data connection is a radio connection. The monitoring images 10 and 11 are provided to the controller 2 as data. The first monitoring image 10 and the second monitoring image 11 are stored in the storage module 13. The first monitoring image 10 and the second monitoring image 11 each have a monitoring image resolution.

The processing module 14 is designed to process the first monitoring image 10 so as to form a first reduced image 16, wherein this processing comprises at least a partial reduction in resolution. Furthermore, the processing module 14 is designed to process the second monitoring image 11 into a second reduced image 17, wherein this processing corresponds to an at least partial reduction in resolution. The processing module 14 is in this case designed to show areas of the first monitoring image 10, which depict areas of the monitoring area 5 that are further away than the limit object distance G, at a first resolution, wherein areas of the first monitoring image 10 that show areas of the monitoring area 5 that are closer to the camera device 3 than the limit object distance G are shown at a second resolution. In particular, the first resolution is a higher resolution than the second resolution. In this case, areas of the monitoring area 5 that are situated closer to the camera device 3 than the limit object distance G are shown with a reduced resolution in the reduced image 16, wherein areas of the monitoring area 5 that are situated further away are shown with a higher resolution. The first reduced image 16 thus has a low-resolution section 19 and a high-resolution section 20. In particular, the resolution of the high-resolution section 20 is at least twice as great as the resolution of the low-resolution section 19.

The processing module 14 is furthermore designed to reduce the second monitoring image 11 such that areas of the monitoring area 5 that are further away than the limit object distance G are shown with a higher resolution than areas of the monitoring area 5 that are closer to the camera device 3 than the limit object distance G. The second reduced image 17 thus likewise has a low-resolution section 19 and a high-resolution section 20.

The evaluation module 15 obtains the first reduced image 16 and the second reduced image 17 from the processing module 14. The evaluation module 15 is designed to stereoscopically evaluate the monitoring area 5 based on the first reduced image 16 and the second reduced image 17 and to create a 3D model 21 of the monitoring area 5 based on the first reduced image 16 and the second reduced image 17. It is possible, by way of the 3D model 21, to determine distances between the objects 12a and 12b.

Figure 2:
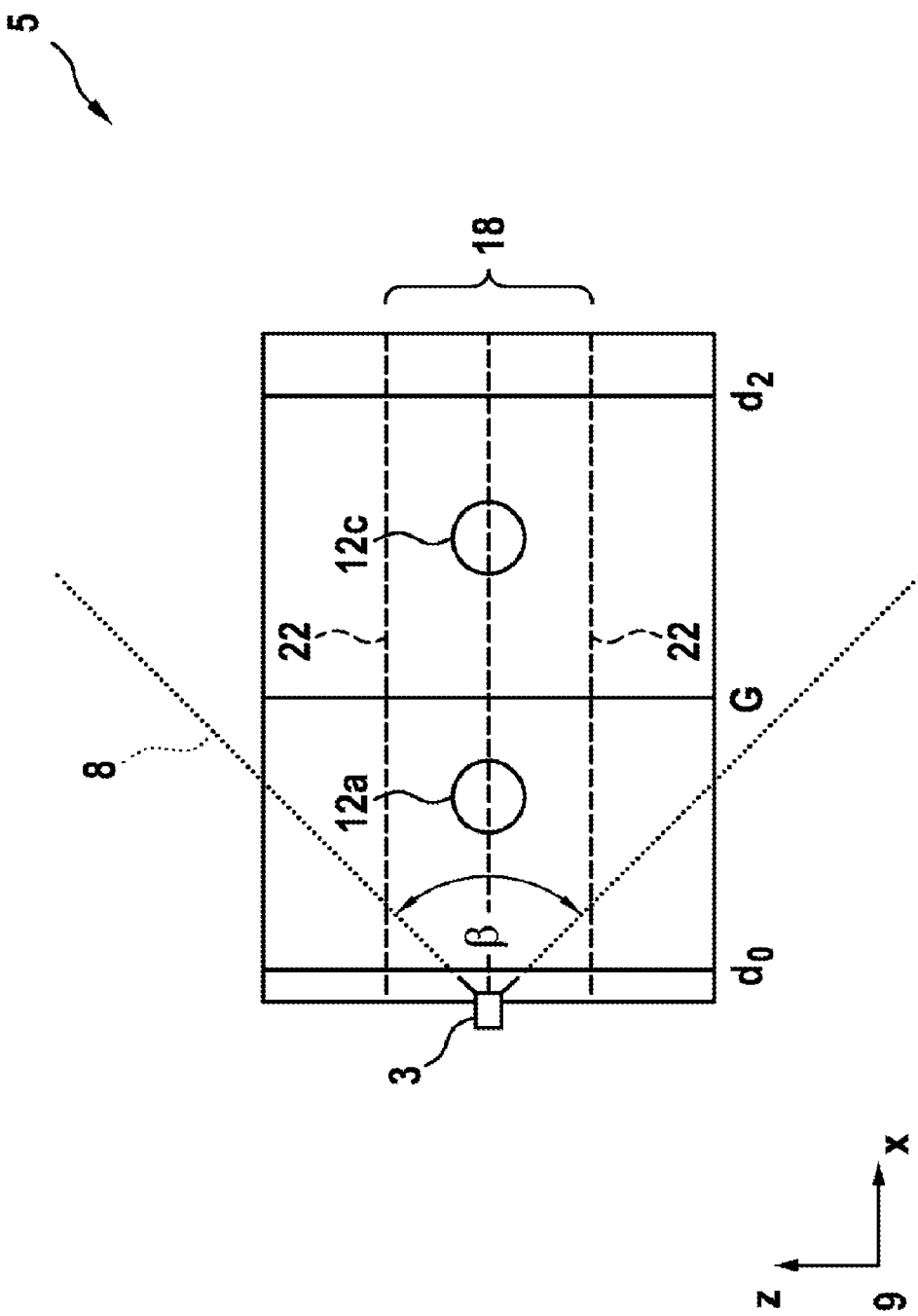
FIG. 2 shows a plan view of the monitoring area and the camera device.

FIG. 2 shows a top-down plan view onto the monitoring region 4. This plan view furthermore shows the camera device 3 with its field of view 8. The top-down plan view corresponds in particular to a view onto the XZ plane, wherein the assistive coordinate system 9 with the axes X and Z is shown for the sake of clarification. The Z axis is in particular perpendicular to the X axis and to the Y axis, wherein the coordinate system 9 forms a Cartesian coordinate system. The angle of aperture β of the field of view 8 in the XZ plane is ninety degrees here. In particular, the angle β that spans the field of view 8 in the XZ plane is greater than seventy degrees and especially less than one hundred and twenty degrees. The camera device 3, in particular the first camera unit 6 and the second camera unit 7, forms the monitoring area 5. In the monitoring region 4 and in the monitoring area 5, the object distances $d_0$ and $d_2$ and the limit object distance G are plotted as lines parallel to the Z axis.

The camera device 3 is designed to monitor a corridor 18, wherein the corridor 18 is arranged in the monitoring area 4 and is bounded by walls 22.

A first person 12a and a second person 12b are situated on the corridor 18 in the field of view 8 of the camera device 3. The first person 12a has an object distance less than the limit object distance G, whereas the second person 12b has an object distance greater than the limit object distance G.

FIG. 3 shows an example of a reduced image 16, 17 of the monitoring area 5 from FIG. 2. In the reduced image 16, the assistive lines of the object distances $d_0$ and $d_2$ and the limit object distance G are plotted. Due to the imaging properties, the assistive line of the limit object distance G appears to be situated closer to the object distance $d_2$ and the limit object distance G appears to be situated further away from the object distance $d_0$. It should also be added to the image that the walls 22 of the corridor are illustrated as continuous straight lines in the reduced image. While the first person 12a and the second person 12b have the same size in reality, the first person 12a and the second person 12b are depicted as having different sizes in the reduced image 16, wherein the person 12a having the lower object distance appears larger than the further away second person 12b.

Alternatively, the coordinate system 9 is plotted in the reduced image 16. The area of the reduced image 16 between the limit object distance G and the object distance $d_0$ is the low-resolution section 19 that has a lower resolution than the high-resolution section 20. The figure shows the actual high-resolution section 20, which is arranged between the limit object distance G and the object distance $d_2$ in the reduced image 16, in shaded form. The actual high-resolution area 20a is able to be cropped by the user so as to form a cropped high-resolution section 20b. In this exemplary embodiment, the cropped high-resolution section 20b is that region of the actual high-resolution section 20a is situated in the region of the corridor 18 or that region of the high-resolution section 20 that comprises the walls 22 of the corridor.

The invention claimed is:

1. A controller (2) for a camera device (3) for stereoscopically recording a monitoring area (5) containing objects (12a, 12b),
   wherein the camera device (3) comprises a first camera unit (6) and a second camera unit (7), wherein the first camera unit (6) is designed to record a first monitoring image (10) of the monitoring area (5), wherein the second camera unit (7) is designed to record a second monitoring image (11) of the monitoring area (5),
   wherein the camera device (3) is designed to provide the first monitoring image (10) and the second monitoring image (11) to the controller (2), wherein the distance between the camera unit (6) and the object (12a, 12b) in the monitoring area (5) is in each case referred to as object distance (d, $d_0$, $d_2$), having a processing module (14), wherein the processing module (14) has at least one limit object area (G) and is designed to process the first monitoring image (10) so as to form a first reduced image (16) and to process the second monitoring image (11) so as to form a second reduced image (17), wherein the first reduced image (16) and the second reduced image (17) each have a high-resolution section (20) and a low-resolution section (19), wherein the high-resolution section (20) is in each case a section that shows a remote area of the monitoring area (5), wherein the remote area is an area of the monitoring area (5) that is further away from the camera device (3) than the limit object area (G), wherein the low-resolution section (19) is a section that shows a near area of the monitoring area (5), wherein the near area is an area of the monitoring area (5) that is closer to the camera device (3) than the limit object area (G), having an evaluation module (15) for stereoscopically recording the monitoring area (5) based on the first reduced image (16) and the second reduced image (17).

2. The controller (2) as claimed in claim 1, further comprising an input module for inputting the limit object area (G).

3. The controller (2) as claimed in claim 2, wherein the input module has a display unit for displaying the first monitoring image (10), the second monitoring image (11) or both, wherein the input module is designed such that a user is able to graphically define the limit object area (G) in the displayed first monitoring image (10), the second monitoring image (11), or both.

4. The controller (2) as claimed in claim 2, characterized in that the input module is designed such that the user is able to define the limit object area (G) by selecting a linear boundary or a flat section in the first monitoring image (10), in the second monitoring image (11) or both.

5. The controller (2) as claimed in claim 1, wherein the input module is designed such that the user is able to manually crop the high-resolution section (20).

6. The controller (2) as claimed in claim 1, wherein the processing module (14) has a first limit object area (G) and a second limit object area (G), wherein the reduction of the first monitoring image (10) so as to form the first reduced image (16) is based on the first limit object area (G) and the reduction of the second monitoring image (11) so as to form the second reduced image (17) is based on the second limit object area (G).

7. The controller (2) as claimed in claim 1, wherein the resolution of the high-resolution section (20) is at least twice as great as the resolution of the low-resolution section (19).

8. The controller (2) as claimed in claim 1, wherein the first reduced image (16) and the second reduced image (17) each have a multiplicity of sections, wherein the sections have different resolutions, wherein the processing module (14) is designed to define the resolution of the sections such that the ratio of resolution to minimum or maximum distance of the object area (G) does not fall below a definable limit value.

9. The controller (2) as claimed in claim 1, wherein the evaluation module (14) is designed to provide a stereoscopic image of the depicted monitoring area (5) based on the first reduced image (16) and the second reduced image (17).

10. The controller (2) as claimed in claim 1, wherein the first camera unit (6) is designed to record a first test image and the second camera unit (7) is designed to record a second test image, wherein the first test image and the second test image each have a test resolution and show the monitoring area (5), wherein the processing module (14) is designed to estimate object distances (d, $d_0$, $d_2$) based on the first test image and the second test image and to estimate the areas of the high-resolution section (20), the low-resolution section (19) or both in the reduced images (16, 17).

11. A camera arrangement (1) comprising the camera device (3) and the controller (2) as claimed in claim 1, wherein the camera device (3) and the controller (2) have a data connection.

12. A method for stereoscopically recording a monitoring area (5), wherein a first monitoring image (10) is recorded by way of a first camera unit (6) and a second monitoring image (11) is recorded by way of a second camera unit (7), wherein the first monitoring image (10) and the second monitoring image (11) show the monitoring area (5), wherein the distance between the camera unit (6, 7) and an object (12a, 12b) in the monitoring area (5) is in each case referred to as object distance (d, $d_0$, $d_2$), wherein the first monitoring image (10) is processed so as to form a first reduced image (16) and the second monitoring image (11) is processed so as to form a second reduced image (17), wherein the first reduced image (16) and the second reduced image (17) each have a high-resolution section (20) and a low-resolution section (19), wherein the high-resolution section (20) is in each case a section that shows a remote area of the monitoring area (5), wherein the remote area is an area of the monitoring area (5) that is further away than a limit object area (G), wherein the low-resolution section (19) is a section that shows a near area of the monitoring area (5), wherein the near area is an area of the monitoring area (5) that is closer to the camera device (3) than the limit object area (G), wherein the monitoring area (5) is stereoscopically evaluated based on the first reduced image (16) and the second reduced image (17).

* * * * *